(12) United States Patent
Bernard

(10) Patent No.: US 9,108,712 B2
(45) Date of Patent: Aug. 18, 2015

(54) AIRSHIP WITH A CONTROLLED VARIABLE PROFILE

(75) Inventor: Alain Bernard, Paris (FR)

(73) Assignee: VOLIRIS, Yzeure (FR)

( * ) Notice: Subject to any disclaimer, the term of this patent is extended or adjusted under 35 U.S.C. 154(b) by 134 days.

(21) Appl. No.: 14/004,784

(22) PCT Filed: Mar. 7, 2012

(86) PCT No.: PCT/IB2012/000417
§ 371 (c)(1),
(2), (4) Date: Nov. 8, 2013

(87) PCT Pub. No.: WO2012/123793
PCT Pub. Date: Sep. 20, 2012

(65) Prior Publication Data
US 2014/0054421 A1    Feb. 27, 2014

(30) Foreign Application Priority Data
Mar. 15, 2011    (FR) ...................................... 11 00774

(51) Int. Cl.
*B64B 1/58* (2006.01)
*B64B 1/04* (2006.01)

(52) U.S. Cl.
CPC .... *B64B 1/58* (2013.01); *B64B 1/04* (2013.01)

(58) Field of Classification Search
USPC ........ 244/29, 30, 31, 124, 125, 126, 127, 128
See application file for complete search history.

(56) References Cited

U.S. PATENT DOCUMENTS

| | | | | |
|---|---|---|---|---|
| 3,446,457 A | * | 5/1969 | Struble, Jr. | 244/30 |
| 6,805,319 B2 | * | 10/2004 | Senepart | 244/96 |
| 7,841,561 B2 | * | 11/2010 | Nachbar | 244/125 |
| 2009/0200417 A1 | * | 8/2009 | Mitchell | 244/30 |

FOREIGN PATENT DOCUMENTS

| | | |
|---|---|---|
| DE | 10241567 A1 | 3/2004 |
| FR | 442295 A | 8/1912 |
| FR | 2802172 A1 | 6/2001 |
| FR | 2927307 A1 | 8/2009 |

OTHER PUBLICATIONS

International Search Report, mailed Aug. 10, 2012, for International Patent Application No. PCT/IB2012/000417.

* cited by examiner

*Primary Examiner* — Justin Benedik
(74) *Attorney, Agent, or Firm* — Thomas, Karceski & Karmilovich, PC

(57) ABSTRACT

The invention relates to an airship comprising a flexible envelope having at least one adjustment region provided with two longitudinal adjustment elements mounted in opposition and mobile in relation to each other between a maximum distancing position and a minimum distancing position, the two longitudinal adjustment elements being connected to each other by a group comprising a plurality of cables crossing the inner space of the envelope, each of the cables cooperating with a plurality or tightening points provided along each longitudinal element. The cables are connected to at least one tightening module that can exert a tightening or loosening action on the cables and thereby bring the longitudinal adjustment elements closer together or move them further away.

13 Claims, 6 Drawing Sheets

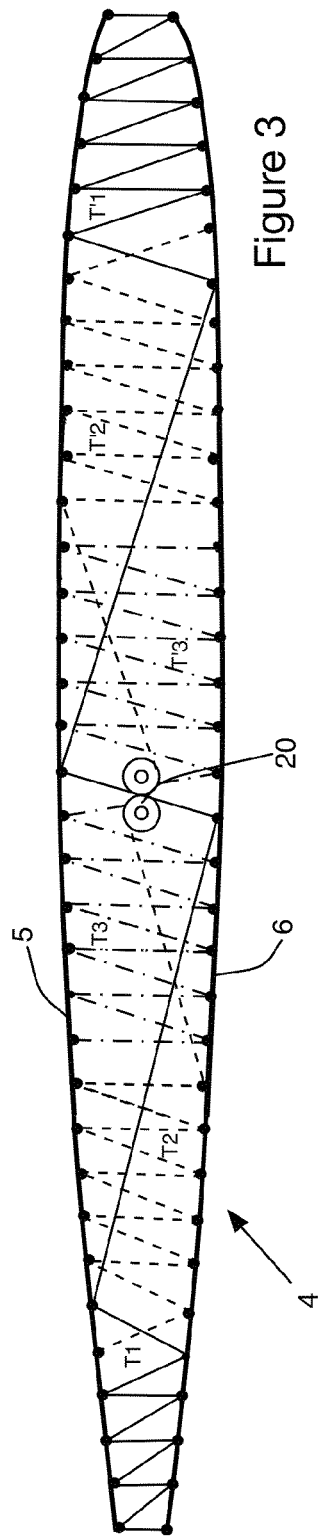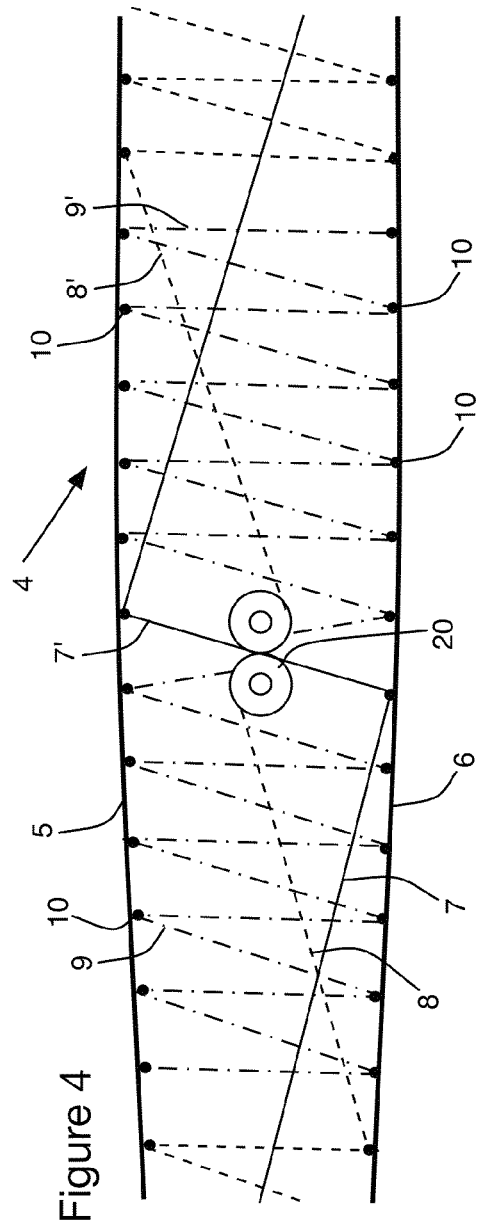

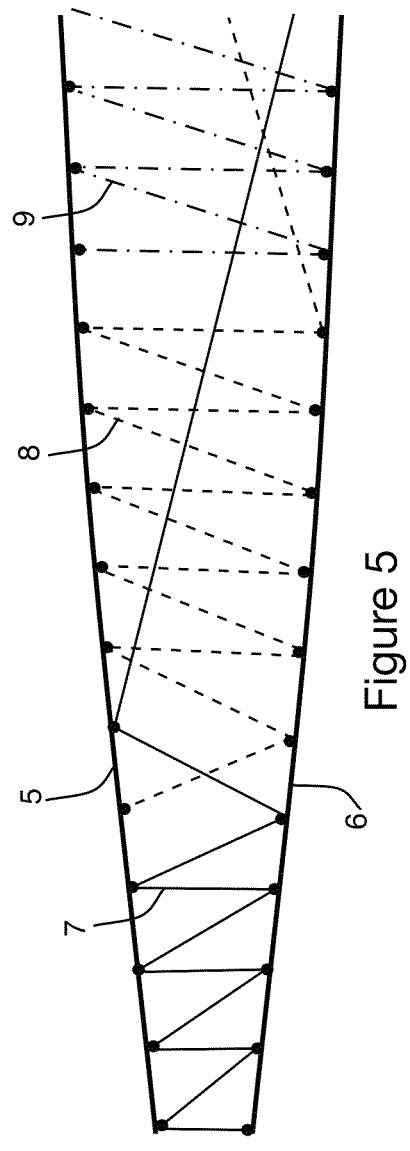
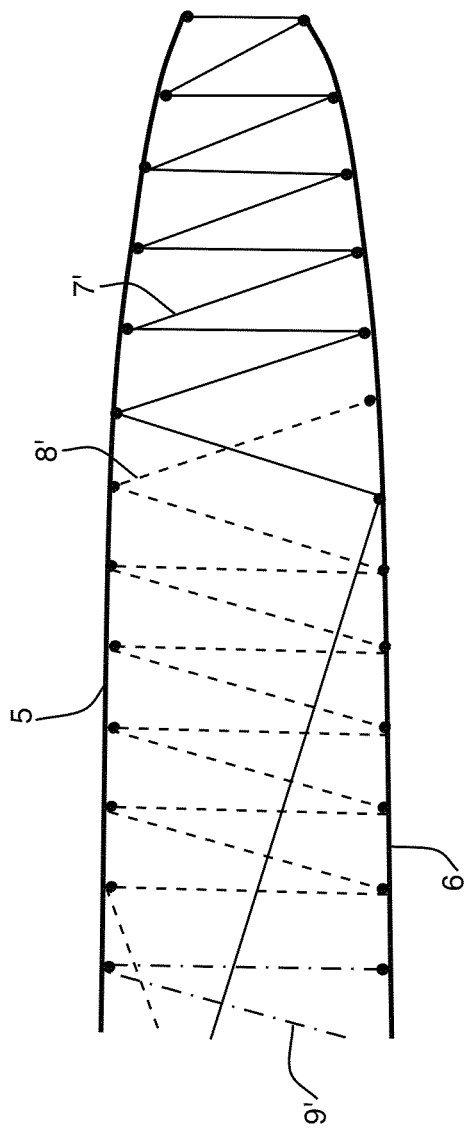

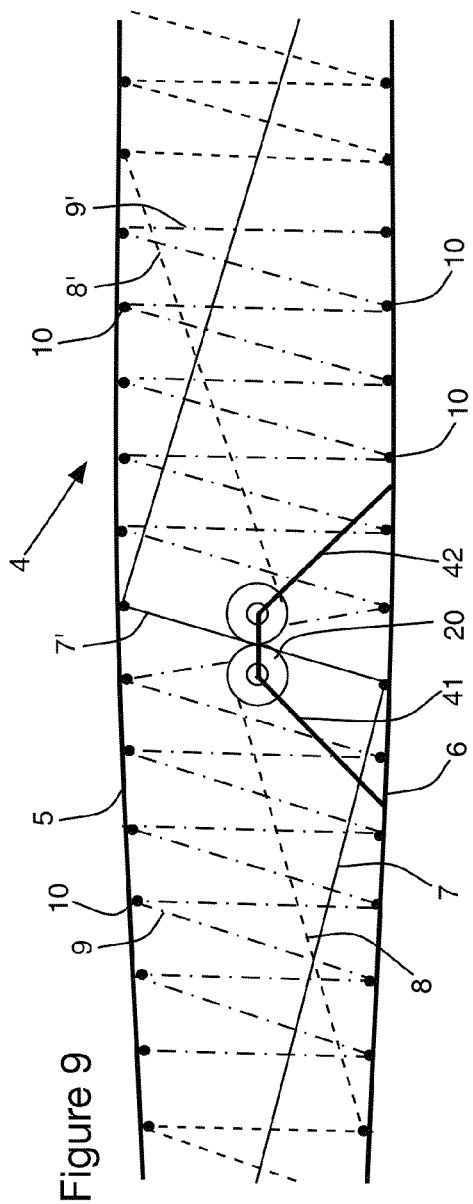
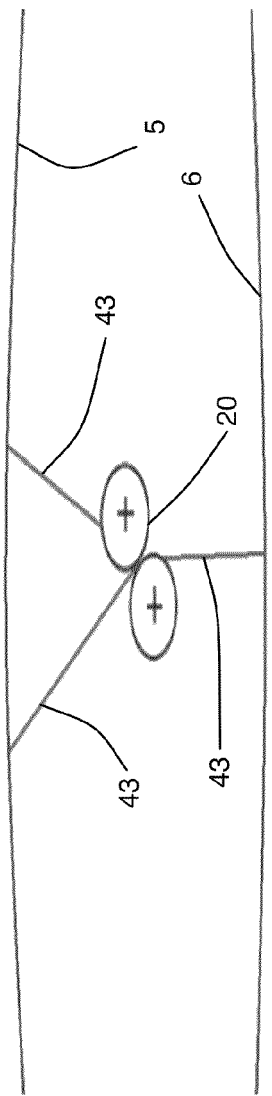

AIRSHIP WITH A CONTROLLED VARIABLE PROFILE

CROSS-REFERENCE TO RELATED APPLICATION(S)

This is a National Stage Entry into the United States Patent and Trademark Office from International PCT Patent Application No. PCT/IB2012/000417, having an international filing date of Mar. 7, 2012, which claims priority to French Patent Application No. FR 11/00774, filed Mar. 15, 2011, the entire contents of both of which are incorporated herein by reference.

FIELD OF THE INVENTION

The present invention relates to an airship. More particularly, it relates to an airship having a flexible envelope defining an inner space capable of being filled with a lifting gas, the envelope having at least one adjustment region provided with a first longitudinal adjustment element fastened on a first side of the envelope and a second longitudinal adjustment element fastened on the opposite side of the envelope.

DESCRIPTION OF RELATED ART

Various examples of aerostats having envelopes with a variable volume are known. For example, document FR 2 802 172 describes a device enabling the airships' variable volume enclosures to folded by continuously transmitting the helium's lift to the aircraft's structure. It is constituted by an outer envelope containing an enclosure having a cardioid shape that can be folded by the pulling action of a winch and of a lacing of cables supported by beams with multiple pulleys. A helium compressor and a valve are interposed between the volumes (V1) and (V2) of the ballasts. When it is necessary to reduce the helium's lift, the latter is forced back into the ballasts and the valve holds the volume of compressed gas. The winch proportionally folds the enclosure (V2) by keeping constant the tension in the bearing cables. The outside air that compensates the difference of volume (V3) between the foldable enclosure (V2) and the envelope is admitted through the exchanger in order to regulate its temperature. In the described device, the valve is a valve whose through-section is strictable by a pneumatic device. This device is well adapted to dirigibles for performing climbing and descending maneuvers. However, this device is complex and heavy due to its double-envelope construction, i.e. a rigid external envelope and a flexible internal envelope. The path of the cable along the envelope is liable to cause folds on the latter, or even to affect its impermeability characteristics. Furthermore, the lacing with a single cable entails a relatively long cable, traveling along the entire periphery of the envelope, thus posing a high risk of creating tensions and/or frictions, resulting in a non-uniform and non-constant operation. Furthermore, the dimensioning of a long and single cable is liable to require a more resistant cable, which is thus heavier and/or more expensive. Finally, in case of a more intense friction causing a possible malfunction, the operating mode with variable geometry could be temporarily unavailable.

Patent application FR 2 927 307 proposes an airship with a flexible envelope having at least one assembly enabling the envelope's geometry to be varied during flight. The assembly comprises:

an upper reinforcement structure fastened onto the upper wall of the envelope and protruding inside the inner space, a lower reinforcement structure fastened onto the lower wall of the envelope and protruding inside the space; and connecting means arranged in the space through which they pass, wherein these means connecting the upper reinforcement structure to the lower reinforcement structure are designed so as to enable a variation of the spacing between these two structures during flight. In one embodiment, provisions are made to use a single cable connecting the two reinforcements, with a winch for winding or unwinding the cable generating the variation in geometry in a controlled fashion. Here again, due to the fact that the aerostat has a considerably large volume, the use of a single cable over the entire length is liable to create friction or stress zones, which makes the operation unstable or irregular. The sizing of the single cable, which has to withstand a relatively strong tension, is also liable to cause disadvantages in terms of mass and/or cost.

Document US 2009200417 describes a long-range airship adapted for flying at high altitude and whose top surface is adapted to be emissive of infrared radiation whilst the bottom surface is adapted to be absorptive of infrared radiation. The overall configuration makes it possible to achieve a variable-thickness flying wing.

Document U.S. Pat. No. 3,446,457 describes an expansion/contraction airship provided with a plurality of spikes connecting a central shaft to the variable surface of the airship. The shaft's rotation enables the length of the spikes, and thereby the volume of the inflated enclosure, to be adjusted.

Document DE 10241567 describes a compressible airship configured with a central support connected by cables to an outer envelope. Cable reels make it possible to vary the length between the central support and the outer envelope.

These different examples of airships illustrate solutions that are complex and costly to implement.

To address these various drawbacks, the invention provides various technical means.

SUMMARY OF THE INVENTION

To start with, a first object of the invention consists in providing an airship having a variable-geometry envelope enabling it to be used in a reliable and safe manner, in a maximum of configurations and weather conditions.

Another object of the invention consists in providing an airship having a controlled variable-geometry envelope, enabling the geometry to be made to vary in various configurations, such as in flight, to optimize the ascent and descent operations or to optimize the aerodynamic profile, or on the ground, for example to enable the airship to be placed in a restricted-height hangar.

Another object of the invention consists in providing an airship having the most advantageous weight characteristics possible, without affecting safety.

To this end, the invention provides an airship having a flexible envelope defining an inner space capable of being filled with a lifting gas, the envelope having at least one adjustment region provided with a first longitudinal adjustment element fastened on a first side of the envelope and a second longitudinal adjustment element fastened on the other side of the envelope, both adjustment elements being mounted in opposition and mobile in relation to each other between a maximum distancing position and a minimum distancing position, the two longitudinal adjustment elements being connected to each other by an assembly comprising a plurality of cables crossing the inner space, each of the cables cooperating in a sliding manner with a plurality of tightening points provided along each longitudinal element, the cables being connected to a winch capable of exerting a tightening or loosening action on the cables in order to bring the longitudinal adjustment elements closer together or move them further apart, wherein the winch is mounted in a floating manner and comprises a motor coupled with at least one reducer coupled to a plurality of wheels enabling the assembly's cables to be wound or unwound, the multiple tensile forces of the assembly's cables and the reduction rate of the reducer or reducers being provided so as to enable the torque effect induced by the motor to be offset in order to maintain the assembly's balance in the cables' plane.

In such an architecture, the relative position of the longitudinal adjustment elements can be adjusted at will, if necessary, in order to optimize the configuration in flight or on the ground. The multi-cable arrangement enables the tightening module to be positioned at an optimal location, and furthermore to avoid cable lengths that are too great, in order to better manage the distribution of forces and make it possible, if necessary, to position several tightening modules, for example one module per cable.

According to one advantageous embodiment, the diameters of the wheels are set in order to allow the cable tensions to be balanced.

According to another advantageous embodiment, the winch comprises two spindles driven by a single motor mounted between the spindles.

According to an advantageous embodiment, a plurality of wheels is mounted in coaxial fashion.

According to another advantageous embodiment, the winch is placed roughly between the cable lacings of the assembly.

The winch preferably comprises a worm reducer with sufficient demultiplication to maintain forces roughly balanced at the tightening module level: as the winch rests in the cables' plane, a balancing would not be possible without significant demultiplication, with the cables' plane not being driven in rotation in the opposite direction to the motor's direction of rotation. The demultiplication rate depends on many parameters, and notably on the motor's power. One embodiment provides for a motor rotation of 900 rpm for a wheel rotation of 4 rpm, i.e. a demultiplication of the order of 1:200. Other rates, lower or higher than 1:200, can be provided depending on the case.

Taking into account the imposing volume of the sails, there are many risks of stress zones being created due to the presence of frictions. A balanced arrangement makes it possible to minimize the risks of imbalance during implementation.

The loose mounting of the winch relative to the two longitudinal elements, in addition to the weight savings linked to the elimination of the winch fastening elements, enables the geometry to be uniformly varied, which avoids one zone deforming more or less quickly than another.

Also in an advantageous manner, the cables are mounted in a sliding fashion at the tightening points. The sliding mode can be achieved either by sliding the cables against a pivot point or by bearing them along a roller acting like a pulley.

According to yet another embodiment, the winch is connected by means of fastening elements. This type of assembly makes it possible to avoid any displacement or change of position of the winch during a tightening or loosening operation if the balance of forces were to be broken, be it for a short duration or in an extended manner. Potential collisions between the winch and the envelope or the longitudinal elements are thus avoided. The fastening elements can be rigid, semi-rigid or non-rigid. It is thus possible to use rods, cables, ropes, elastics etc.

According to another variant embodiment, the winch comprises pairs of wheels with roughly identical diameters, for winding pairs of cables (for example, the cable assembly comprises three pairs of cables mounted on three pairs of wheels). In such a case, the pairs of wheels advantageously have distinct diameters.

According to yet another embodiment, the longitudinal adjustment elements comprise flexibility zones.

Advantageously, the winch comprises an explosion-proof electric motor. This type of arrangement can thus be used with any type of lifting gas, including hydrogen.

According to yet another embodiment, at least one actuator or at least one brake cooperating with one of the cables is adapted to cause the tension of said cable to vary.

According to another variant embodiment, the airship comprises two adjustment regions roughly parallel to one another. The two regions are preferably roughly parallel to the airship's longitudinal axis.

According to yet another embodiment, the airship also has the characteristics of an aerodyne. The resulting hybrid aircraft can thus perform according to various flight configurations, sometimes like an aerostat and sometimes like an aerodyne. Furthermore, the streamlined profile of the envelope, in the shape of a wing, makes it possible to reach speeds that are considerably higher than for a conventional, "cigar"-shaped aerostat.

BRIEF DESCRIPTION OF THE FIGURES DRAWINGS

All the execution details are given in the following description, completed by FIGS. 1 to 10, given only by way of non-limiting example, and wherein:

FIG. 3 is a schematic cross-section of a longitudinal section of an example of execution of an airship according to the invention at one of the adjustment regions, showing the longitudinal adjustment elements, the cable assembly and the tightening module;

FIG. 4 is an enlarged view of the central portion of FIG. 3, showing more precisely the arrangement details of the device for varying the geometry according to the invention;

FIG. 5 is an enlarged view of the left-hand portion of FIG. 3, showing more precisely the arrangement details of the device for varying the geometry according to the invention;

FIG. 6 is an enlarged view of the right-hand portion of FIG. 3, showing more precisely the arrangement details of the device for varying the geometry according to the invention;

FIG. 9 is an enlarged view of the central portion of FIG. 3, showing schematically a variant embodiment wherein the tightening module is fastened to a longitudinal adjustment element;

FIG. 10 is an enlarged view of the central portion of FIG. 3, showing schematically another embodiment wherein the tightening module is fastened to both longitudinal adjustment elements.

DETAILED DESCRIPTION OF EMBODIMENT(S) OF THE INVENTION

Figure 1:
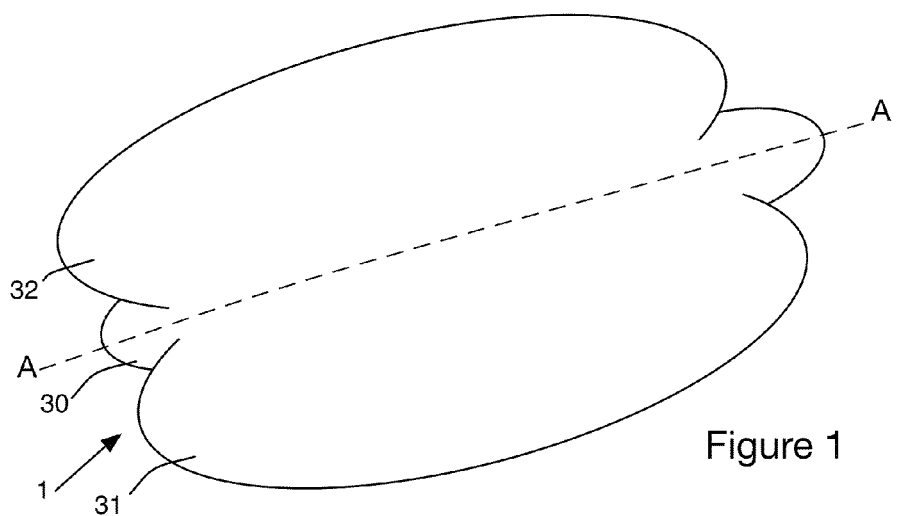
FIG. 1 is a schematic representation of an airship according to the invention.
Figure 2A:
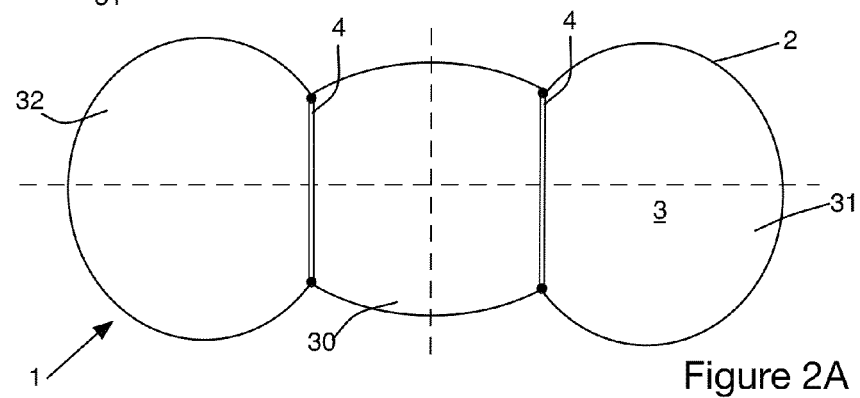
FIG. 2A is a cross-section of the airship of FIG. 1.

FIG. 1 illustrates an example of embodiment of an airship 1 of roughly elongated shape, with a main lobe 30 placed centrally and extending along a longitudinal axis A-A, and two lateral lobes 31, 32 cooperating with the central lobe. Neighboring lobes cooperate with one another so that the inner space 3 is continuous and unique for the three lobes. FIG. 2A shows a cross-section of the airship, disclosing an example of profile formed by the three-lobed architecture. The airship thus has a roughly planar shape.

Figure 2B:
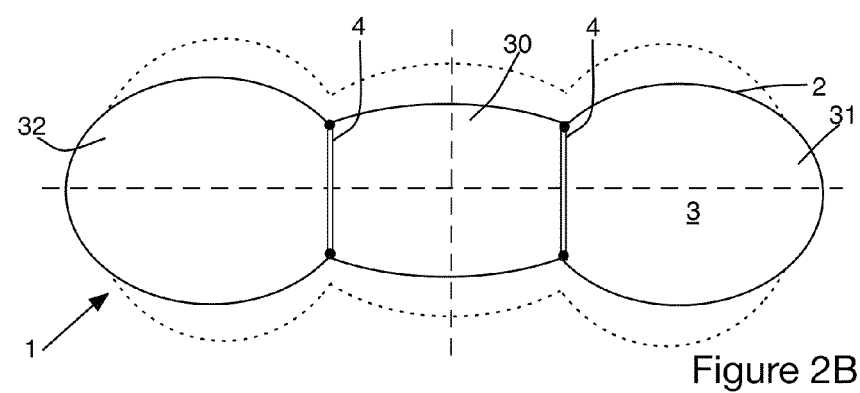
FIG. 2B is a cross-section of the airship of FIG. 1 illustrating schematically one example of geometry variation.

FIG. 2B shows that this profile can be more or less flat, as needed. For example, to performing an altitude climbing, the volume of the inner space 3 is advantageously increased, with an additional injection of lifting gas. When descending, it is useful to be able to reduce this volume, for example by flattening the profile, as illustrated in FIG. 2B.

In order to control the volume variations, adjustment regions 4 are provided, in this example in the intersection zone between the central lobe 30 and the lateral lobes 31 and 32. FIGS. 3 to 6 illustrate the execution details of one of the adjustment regions 4. A first longitudinal adjustment element 5, placed in the upper portion of the inflated envelope in normal flight position, extends longitudinally, roughly parallel to the A-A axis. In a roughly symmetrical fashion, a second longitudinal adjustment element 6, placed in the lower portion of the inflated envelope in normal flight position, also extends longitudinally, in a vertical alignment with the first longitudinal element. These two elements form together an elongated profile, similar to a wing profile. The longitudinal adjustment elements 5 and 6 can be made of a metal alloy (aluminum, titanium or other), of a composite material (preferably fibered) or of wood, depending on the dimensions involved and the force stresses to be taken into account, and according to the airship's intended use. In order to ensure the rigidity of the airship's envelope, the elements 5 and 6 are preferably roughly rigid. As a variant embodiment, at least one of the elements comprises at least one so-called "flexible" zone, having higher deformability characteristics than the so-called "rigid" zones.

In order to maintain and/or to vary the spacing between the two elements 5 and 6, pairs of cables 7, 7', 8, 8' and 9, 9' are provided, connected in alternating fashion to a plurality of points on each of the elements and forming a lacing. In the illustrated example, the cables are arranged in pairs, each member of one pair being placed on one side of the elongated profile formed by the two adjustment elements 5 and 6. Each of the cables is laced only on a limited portion of the elongated profile. For example, the cable 7 as well as the cable 7' enable the left and right end-zones of the elongated profile formed by the elements 5 and 6 to be connected to one another, as shown in FIGS. 3 and 5. The cables 9 and 9' enable the zones adjacent to the central point of the assembly to be connected and the cables 8 and 8' enable the intermediary zones, between the median and end cables, to be connected, as shown in FIGS. 3, 5 and 6. Each cable has one of its ends fastened in a fixed manner to one of the elements 5 or 6, at its position furthest away from the central point. The other end of each cable is connected to a tightening module 20 provided in the assembly's central zone.

This arrangement is specifically provided to enable the tightening module 20 to tense the cables to cause the adjustment elements 5 and 6 to move closer to one another, or to relax them to enable the elements to move away from one another. In order to make the implementation of the device easier, the pairs of cables are preferably arranged so that the tensions are roughly equal and opposite. For example, in the example illustrated in FIG. 3, the tensions T1 and T'1 are roughly equal and opposite, the tensions T2 and T'2 are roughly equal and opposite and the tensions T3 and T'3 are roughly equal and opposite. To facilitate the tightening or loosening of the assembly, the cables are preferably mounted in a sliding manner to the multiple tightening points 10 between the tightening module 20 and the last tightening point, the latter being a fixed fastening point.

The tightening module 20 can take a variety of forms, depending on the embodiments. In the example illustrated, the tightening module 20 is mounted floatingly in the roughly median zone of the elongated profile. It is held in place and in balance thanks to the fact that the pairs of cables are designed to balance, as previously mentioned. Thus, in the illustrated example, three pairs of cables are arranged, with one member of each pair on each side of the tightening module 20. The members of each pair are arranged along the longitudinal elements 5 and 6 so as to achieve a balancing of the forces on each side. Furthermore, as shown in particular in FIGS. 3 and 4, the tightening module is kept stable thanks to a cable configuration along multiple arrival points on the module 20. The cables 8 and 8', with T2 and T'2, generate roughly lateral opposite forces; the cables 7 and 7', with T1 and T'1, generate roughly vertical opposite forces, and the cables 9 and 9', with T3 and T'3, generate roughly vertical opposite forces.

According to variant embodiments, the balance of forces is achieved in various ways, for example by using a different number of pairs of cables and/or by distributing them in a different manner along the elongated profile and/or by adjusting the positions of the tightening points 10 and/or with symmetrical arrangements on each side of the tightening module (cable length, number and positions of the tightening points, etc.).

The cables, or the tightening elements 10, can be provided with tension sensors enabling the tensions present with respect to the different cables to be measured and compared. In order to maintaining the balance, one or several adjustment actuators provided between the tightening elements 10 and the longitudinal adjustment elements are advantageously used. These actuators make it possible to adjust locally the tension of a cable, either to effect a rebalancing or to enable the tightening module 20 to be repositioned. In a variant embodiment, the actuators are replaced by brakes acting on the cables either to create a rebalancing or to reposition the module 20. The actuators or the brakes are preferably electric, remotely operable (from the gondola or by a pilot on the ground), and connected to a power source lodged for example on the airship's gondola.

According to the invention, other arrangements are provided, in which the tightening module is fastened to at least one of the longitudinal adjustment elements 5 or 6, as shown for example in FIG. 9. Fastening elements, such as for example holding rods or bars 41 and 42, are fastened on the one hand to one of the longitudinal adjustment elements 5 or 6 and on the other hand to the tightening module 20. In the example of FIG. 9, the rods are fastened to the element 5. Other fastening points or zones can be provided to achieve an assembly in which the tightening modules are fastened. The number and dimensions of the rods can also be modified.

FIG. 10 shows schematically one example of a variant embodiment of a configuration with a tightening module 20 fastened between two longitudinal adjustment elements by means of fastening elements 43 working on each side with the longitudinal adjustment elements. In such a configuration, fastening elements that are little or not at all rigid, and possibly elastic, such as for example elastics, are advantageously used. Such an embodiment makes it possible to maintain a good static and dynamic balance. Many other fastening means of the tightening modules 20 can be implemented.

In the configurations in which the tightening modules 20 are fastened, the cable assembly can comprise an arrangement in pairs as previously described or also without said pairs. For example, a plurality of cables forming successive lacings along the elongated profile, with a tightening module cooperating with each of the cables, allows the provided tightening/loosening functions to be implemented. According to such an arrangement, two or three cables, or four cables, or five or even more cables can for example be provided, each being mounted in cooperation with a tightening module. The multiple modules are then synchronized to enable uniform actions along the elongated profile.

The cables used are of known type, either textile or metallic, according to the forces involved and the weight constraints to be complied with. The fact of using several cables makes possible a good management of the different zones capable for example of generating different tensions. The multiple cables being furthermore shorter, the dimensioning is also easier to determine and cables of smaller diameter can be used.

Figure 7:
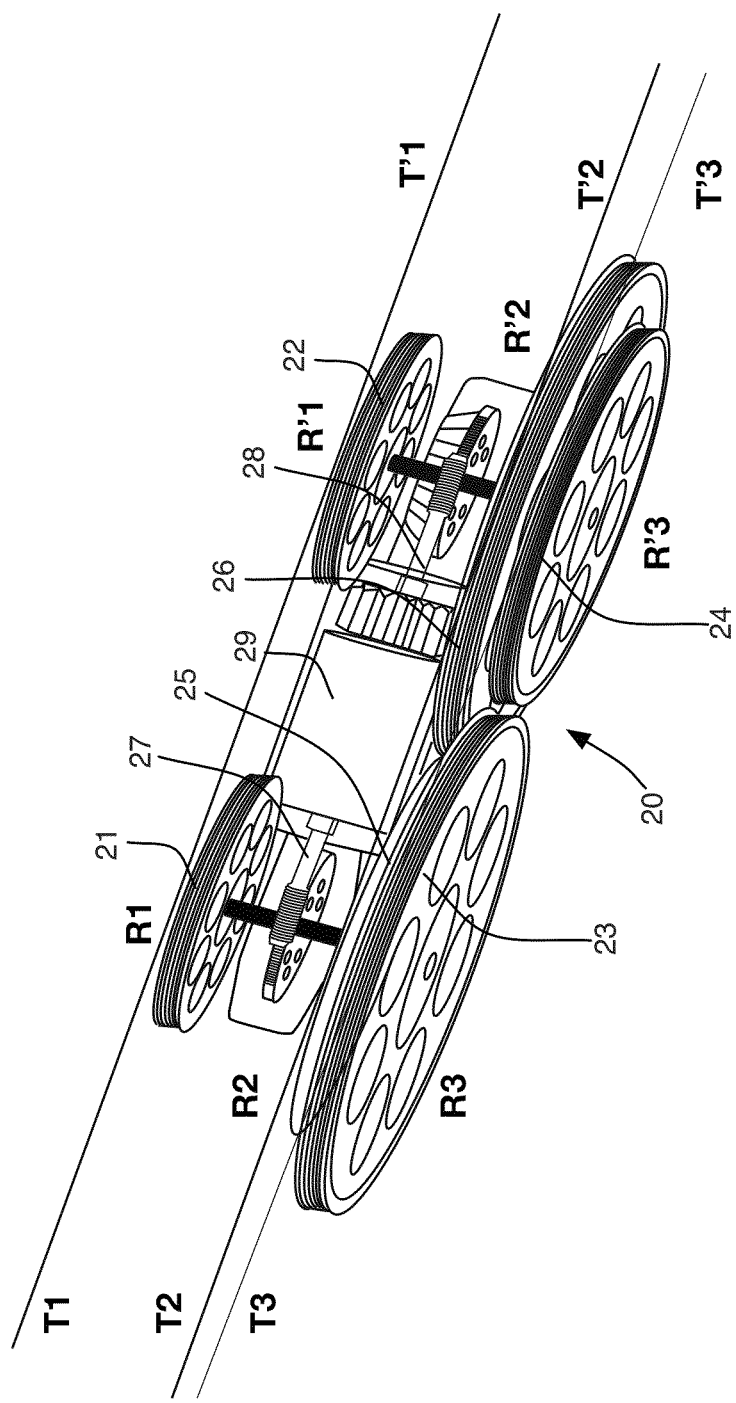
FIGS. 7 and 8 are perspective views of an example of tightening module in the shape of a winch provided with a plurality of winding wheels.
Figure 8:
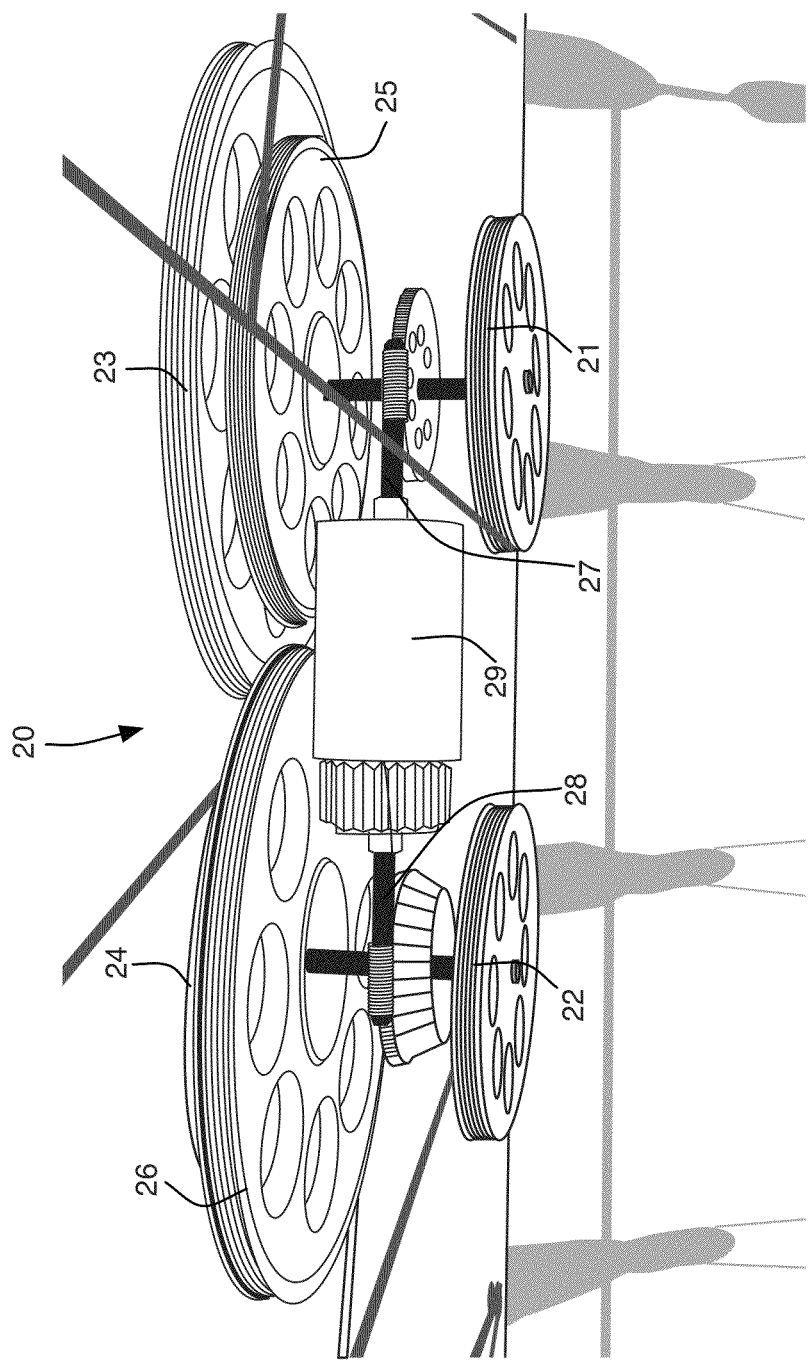

FIGS. 7 and 8 illustrate an advantageous example of a tightening module 20 taking the form of a winch. Such a winch comprises at last two wheels or pulleys driven in different directions by one or several worm gear motors coupled to one another in a mechanical or electronic manner. In order to enhance the dynamic characteristics, a worm reducer with a high demultiplication is advantageously used to minimize the torque effect induced by the rotation, which tends to drive the plane of the module in opposite direction to the motor's direction of rotation. The multiple tensile forces of the assembly's cables can thus supply a support against which the torque effect can be exerted.

In the example illustrated, the winch comprises two multiple-wheel drive-spindles 27 and 28. The spindle 27 bears three wheels 21, 23, 25 of different diameter and mounted in a coaxial fashion. The spindle 28 also bears three wheels 22, 24, 26 of different diameter mounted in a coaxial fashion. Each wheel cooperates with one of the cables 7 or 7', 8 or 8', 9 or 9' of the assembly for winding or unwinding, depending on the desired mode, namely tightening or loosening of the assembly. A worm electric motor unit drives the spindles 27 and 28. In this example, the worm screws are arranged on each side of the motor, the latter being placed between the spindles 27 and 28. The screws can be placed in the extension of the motor shaft. This type of configuration makes it possible to obtain a module that is compact, light and well adapted for being mounted in a floating fashion. Depending on the desired levels of tension and/or the lengths of the cables to be wound, the diameters of the wheels can be easily adapted. Furthermore, to be mounted in a floating manner, the diameters of the wheels are set so as to allow the cable tensions to be balanced.

The motor or motors are preferably DC, with a power source lodged for example in the airship's gondola. To enable any type of lifting gas to be used, including hydrogen, the motors are preferably explosion-proof. The motors are designed to be actuated remotely, for example from the gondola or also by a pilot on the ground.

The figures and their descriptions given here above illustrate the invention rather than limit it. In particular, the invention and its different variant embodiments have just been described in connection with a particular example comprising three lobes. However, it is obvious for the one skilled in the art that the invention can be extended to other embodiments wherein, as variants, only two lobes or also more than three lobes are provided. Furthermore, the examples presented show a single-motor winch coupled with two spindles. However, it is obvious for the one skilled in the art that the invention can be extended to other embodiments wherein, as variants, two motors are provided, each being coupled with one spindle. In such an example, to counter the torque effect induced by the motors, the latter are preferably mounted so as to turn in opposite directions. A support base common to both motors makes it possible to achieve a dynamically stable assembly, while withstanding the forces involved.

The reference signs in the claims have no limiting character. The verbs "include" and "comprise" do not exclude the presence of other elements than those listed in the claims. The word "a/an" or "one" preceding an element does not exclude the presence of a plurality of such elements.

The invention claimed is:

1. An airship having a flexible envelope defining an inner space capable of being filled with a lifting gas, the envelope having at least one adjustment region provided with a first longitudinal adjustment element fastened on a first side of the envelope and a second longitudinal adjustment element fastened on the other side of the envelope, both adjustment elements being mounted in opposition and mobile in relation to each other between a maximum distancing position and a minimum distancing position, the two longitudinal adjustment elements being connected to each other by an assembly comprising a plurality of cables crossing the inner space, each of the cables cooperating in a sliding manner with a plurality of tightening points provided along each longitudinal element, the cables being connected to a winch capable of exerting a tightening or loosening action on the cables in order to bring the longitudinal adjustment elements closer together or move them further apart, wherein the winch is mounted in a floating manner and comprises a motor including a torque effect coupled with at least one reducer coupled to a plurality of wheels enabling the assembly's cables to be wound or unwound, multiple tensile forces of the assembly's cables and the reduction rate of the reducer or reducers being provided so as to enable the torque effect induced by the motor to be offset in order to maintain the assembly's balance in the cables' plane.

2. The airship of claim 1, wherein the diameters of the wheels are set so as to allow the cable tensions to be balanced.

3. The airship of claim 1, wherein the winch is placed roughly between the cable lacings of the assembly.

4. The airship of claim 1, wherein the winch comprises two spindles driven by a single motor mounted between the spindles.

5. The airship of claim 1, wherein the plurality of wheels is mounted in coaxial fashion.

6. The airship of claim 1, wherein the winch comprises a worm reducer.

7. The airship of claim 1, wherein the plurality of wheels comprises pairs of wheels with roughly identical diameters, for winding pairs of cables.

8. The airship of claim 1, wherein the plurality of wheels comprises pairs of wheels having distinct diameters.

9. The airship of claim 1, wherein the winch comprises an explosion-proof electric motor.

10. The airship of claim 1, wherein at least one actuator or at least one brake cooperating with one of the cables is adapted to cause the tension of said cable to vary.

11. The airship of claim 1, comprising two adjustment regions roughly parallel to one another.

12. The airship of claim 1, wherein the two adjustment regions are roughly parallel to the airship's longitudinal axis.

13. The airship of claim 1, furthermore having the characteristics of an aerodyne.

* * * * *